A. H. BUCKLEY.
COMBINATION LOCK FOR AUTOMOBILES.
APPLICATION FILED JAN. 17, 1920.
1,377,307.
Patented May 10, 1921.
3 SHEETS—SHEET 1.
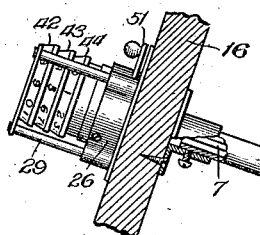
Fig.1
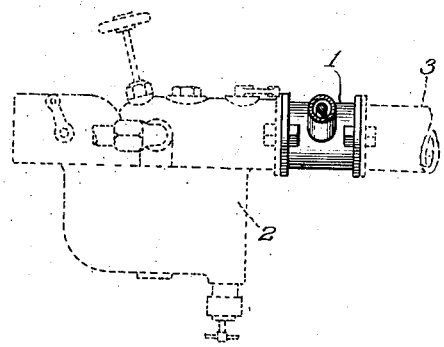
Fig.2
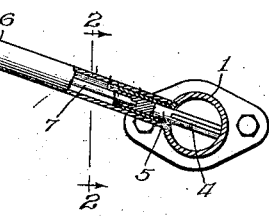
Fig.21
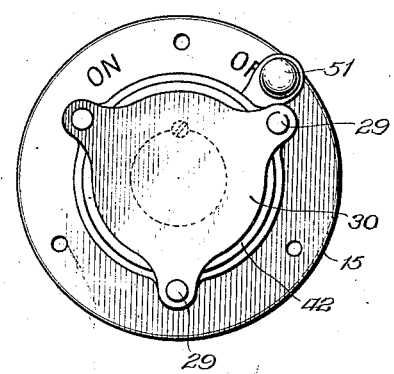
Fig.3
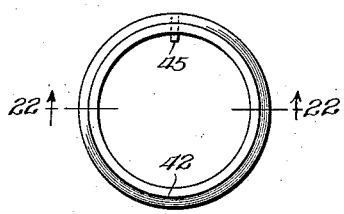
Fig.22
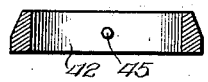
INVENTOR
A.H.Buckley
BY
ATTORNEYS A. H. BUCKLEY.
COMBINATION LOCK FOR AUTOMOBILES.
APPLICATION FILED JAN. 17, 1920.
1,377,307.
Patented May 10, 1921.
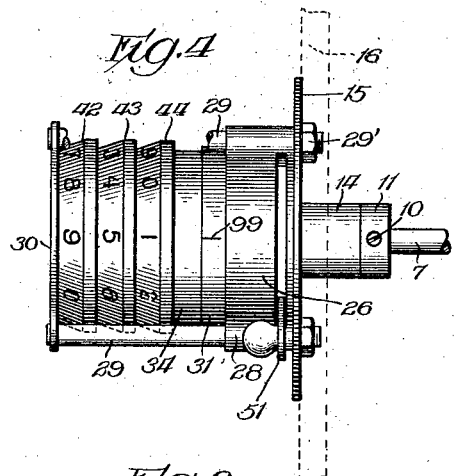
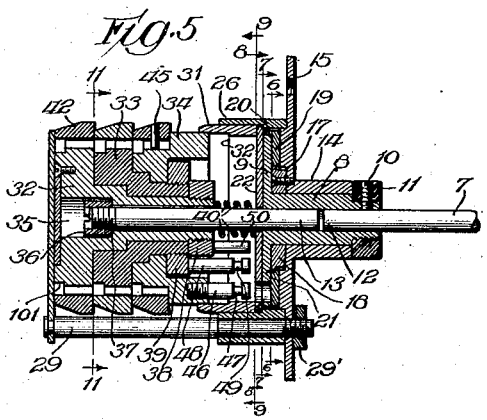
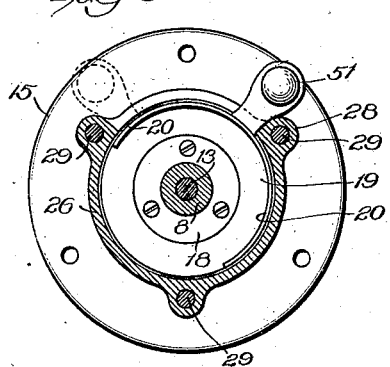
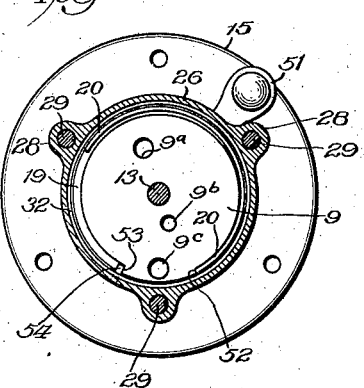
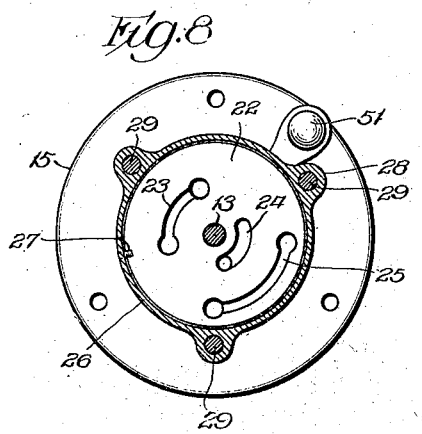
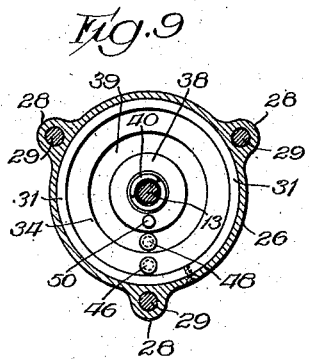
INVENTOR
A. H. Buckley
BY Munn & Co.
ATTORNEYS A. H. BUCKLEY.
COMBINATION LOCK FOR AUTOMOBILES.
APPLICATION FILED JAN. 17, 1920.
1,377,307.
Patented May 10, 1921.
3 SHEETS—SHEET 3.
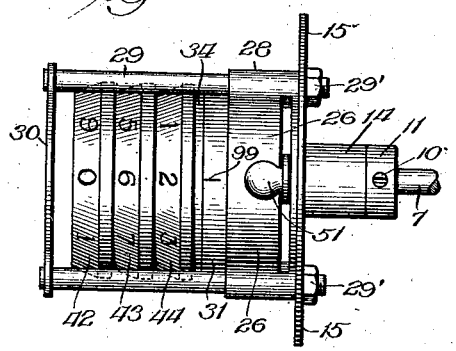
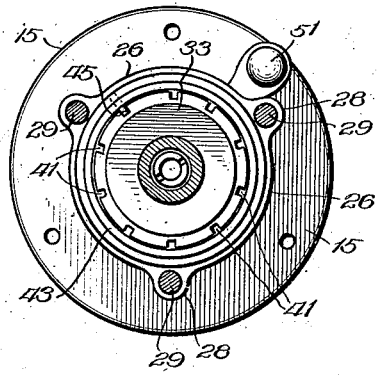
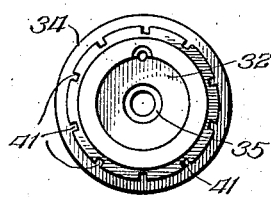
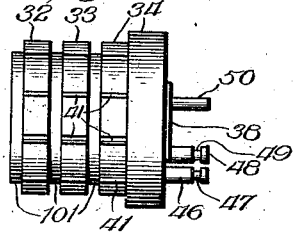
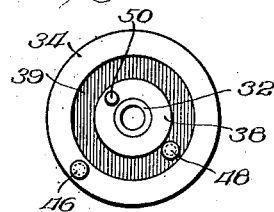
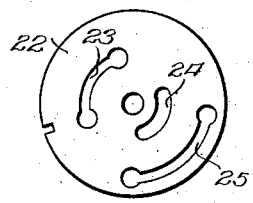
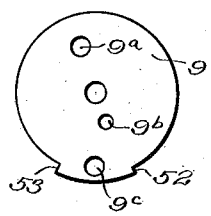
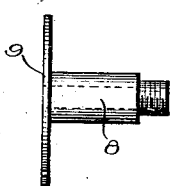
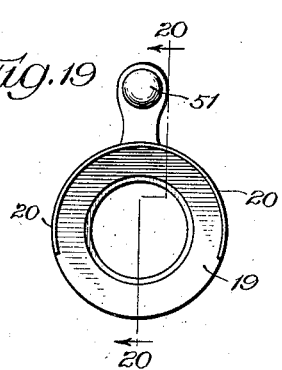
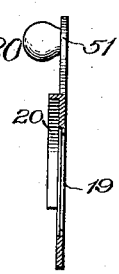
INVENTOR
A. H. Buckley
BY
ATTORNEYS

UNITED STATES PATENT OFFICE.

ARTHUR HERBERT BUCKLEY, OF SYDNEY, NEW SOUTH WALES, AUSTRALIA.

COMBINATION-LOCK FOR AUTOMOBILES.

1,377,307.  Specification of Letters Patent.  Patented May 10, 1921.

Application filed January 17, 1920. Serial No. 352,052.

*To all whom it may concern:*

Be it known that I, ARTHUR HERBERT BUCKLEY, a citizen of Australia, and a resident of Paddington, Sydney, New South Wales, Australia, have invented a new and useful Improvement in Combination-Locks for Automobiles, of which the following is a full, clear, and exact description.

My invention relates to improvements in combination locks for automobiles, and it consists in the combinations, constructions and arrangements herein described and claimed.

An object of my invention is to provide a device by means of which an auxiliary valve in the fuel feed line of an automobile engine may be locked in position so as to shut off the flow of fuel, and thereby prevent the operation of the engine, thus circumventing any attempt to steal the car by running it off on its own power.

A further object of my invention is to provide a device of the type described in which the movement of a single lever in one direction will instantly bring the auxiliary valve into its closed and locked position.

A further object of my invention is to provide a novel form of combination lock which is comparatively simple in operation.

A further object of my invention is to provide a combination lock in which the combination may be rapidly changed without dismantling the apparatus.

Other objects and advantages will appear in the following specification, and the novel features of the invention will be particularly pointed out in the appended claims.

My invention is illustrated in the accompanying drawings, forming part of this application, in which—

Figure 1 is a side elevation of a lock and its connections, certain parts being shown in section, Fig. 2 is an enlarged section along the line 2—2 of Fig. 1, Fig. 3 is an end view of the lock, Fig. 4 is a side elevation of the lock in one position, Fig. 5 is a central section through the lock, Fig. 6 is a section along the line 6—6 of Fig. 5, Fig. 7 is a section along the line 7—7 of Fig. 5, Fig. 8 is a section along the line 8—8 of Fig. 5, looking in the direction of the arrows, Fig. 9 is a section along the line 9—9 of Fig. 5, looking in the direction of the arrows, Fig. 10 is a side elevation of the lock in another position, Fig. 11 is a section along the line 11—11 of Fig. 5, Fig. 12 is an end view of the three sleeves shown in Fig. 13, Fig. 13 is a side view of the three sleeves, Fig. 14 is a view of the opposite end of the sleeves shown in Fig. 13, Fig. 15 is a detailed face view of one of the plates, Fig. 16 is an edge view of the plate shown in Fig. 15, Fig. 17 is a face view of another plate, Fig. 18 is a side view of the plate shown in Fig. 17 and its integral sleeve, Fig. 19 is a face view of another plate or disk, Fig. 20 is a section along the line 20—20 of Fig. 19, Fig. 21 is a face view of one of the rings, and Fig. 22 is a section along the line 22—22 of Fig. 21.

In carrying out my invention, I provide a fixture 1 which consists of a cylindrical connection between the carbureter 2 (see Fig. 2) and the pipe 3 leading to the intake manifold (not shown). This connection 1 is a valve 4 of the butterfly type, this valve being secured to a stem 5 which is carried within a tubing or housing 6. Secured to the stem 5 is an operating rod 7. When the rod 7 is turned, it will open or close the valve 4, depending upon the amount of rotation. In Fig. 1, the valve is shown open and when the rod is rotated at 90° the valve is closed.

Referring now particularly to Fig. 5, it will be seen that the opposite end of the rod 7 is connected to a hub 8 of a disk 9 by means of a set screw 10, which passes through a collar 11 screwed onto the reduced end portion of the hub 8. The rod 7 terminates at 12 and there is an auxiliary extension 13 which is rigidly secured to the hub 8. Disposed exteriorly of the hub 8 is the hub 14 of a disk or plate 15 which is designed to be secured to the dash-board 16 of an automobile. The plate 15 has a recess 17, in which is disposed a retaining plate 18 for a movable disk 19, having a flange 20 arranged to overlie the outer edge of the disk 9. The plate 18 is provided with a flange 21 for holding the disk 19 in position while permitting rotation of the latter. A circular plate 22 is mounted on the extension 13, this plate being provided with three slots 23, 24 and 25 (see Fig. 8), the slots 23 and 25 having enlarged end portions, as shown. The plate 22 is held in fixed relation with an exterior ring 26 by means of a small screw 27. The ring 26 is provided with bosses 28 which are provided with openings arranged to receive rods 29 which pass through the bosses and through registering openings in the disk 15, being provided with nuts 29′ for securing the rods in position. The opposite ends of the rods 29 are secured to an end plate 30 to constitute the end plate and guide cage for the movable elements of the locking mechanism, as will be explained later. Within the ring 26 is a fixed sleeve 31 having a shoulder 32.

Disposed at one end of the extension 13 are the three nested sleeves 32, 33 and 34 respectively. It will be observed that the sleeve 32 is mounted directly on the shaft for slidable movement with respect thereto. It has a central recess 35 by means of which a cap 36 may be screwed on to the end of the extension 13 to engage a shoulder 37 on the sleeve 32 to limit the movement of the latter. The sleeve 33 is rotatable with respect to the sleeve 32, but is held in engagement therewith by a nut 38 on the threaded end of the sleeve 32. A nut 39 on the threaded end of the sleeve 33 retains the sleeve 34 in engagement with the sleeve 33. A spiral spring 40 is disposed between the end of the sleeve 32 and the disk 22 to normally keep the nested sleeves extended toward the left in Fig. 5.

As will be seen from Figs. 5 and 12, the sleeves are provided with peripheral recesses 41 which are spaced at equal distances and which may be brought into alinement for a purpose hereinafter explained.

Mounted on each sleeve for rotation thereon is a ring, these rings being shown at 42, 43 and 44 respectively. Each ring is provided with a series of numerals on a beveled portion thereof, these numerals corresponding to the notches 41. Each ring is provided with an inwardly extending pin 45 which is arranged to enter one of the recesses of its associated sleeve.

As will be observed from Fig. 5, the sleeve 34 is provided with a pin 46 having a groove 47 near one end. The nut 39 is provided with a pin 48 having a groove 49 near one end. The nut 38 is provided with a pin 50. The pins 46, 48 and 50 are designed to enter the openings 25, 23 and 24 respectively in the plate 22 under conditions to be explained later. It will be noted that in Fig. 5, these pins are all shown on one side of the center of the extension 13, but this position is one of many positions in which the sleeves are locked out from being moved forward because of the fact that the pins are not in position to enter the slots.

Referring now particularly to Fig. 7, it will be noted that the disk 9 is provided with three openings 9ª, 9ᵇ and 9ᶜ which are arranged to register with the ends of the slots 23, 24 and 25 in the disk 22, so as to permit the entrance of the pins when such registration takes place, and when the pins are in the proper position, as determined by the relative position of the sleeves. It will also be noted that in Fig. 5, while the disk 9 is rotatable, together with the rod 7 to which it is secured, the disk 22 is in fixed relation with the dash-board. The slots 23, 24 and 25 will permit the rotation of the disk 9 with respect to the disk 22, while preventing the retraction of the pins until they reach the enlarged ends of the slots.

Secured to the disk 19 (see Fig. 6) is a handle 51, by means of which the disk may be rotated. This disk 19, as has been stated, is provided with the flange 20 which is arranged to engage a shoulder 52 on the disk 9 for a purpose hereinafter stated. The movement of the disk 9 is limited by the engagement of a shoulder 53 with a stop pin or screw 54.

From the foregoing description of the various parts of the device, the operation thereof may be readily understood. In the normal operation of the car, that is to say, when the lock is not desired to be used, the rings 42, 43 and 44, as well as the sleeves 32, 33 and 34, are moved rearwardly into the position shown in Figs. 1 and 5. It has been before stated that in order to push the rings and the sleeves forwardly, the slots 41 (see Figs. 1 and 3) must be in registration. Not only this, but the right combination must be secured before the forward movement can take place. Assume that the combination is 9—5—1 (see Fig. 4), the rings are turned until they are in the position shown in Fig. 4, in which position they register with the indicating mark 99. The rings, together with their sleeves, may now be pushed forward and the pins 46, 48 and 50 will enter their respective slots 25, 23 and 24 in the plate 22.

Let us assume that the auxiliary butterfly valve 4 is locked in the position so that no gas can pass from the carbureter 2 into the engine. The procedure for unlocking the valve is as follows:

The rings 42, 43 and 44, and the sleeves 32, 33 and 34 of the lock are in the back position, resting against the plate 30. To open the butterfly valve, the rings 42, 43 and 44 must be arranged so that certain numbers thereon are in alinement, which will place the sleeves 32, 33 and 34 in position so that the pins 46, 48 and 50, which are secured to the rings 34, 33 and 32, are in alinement with one end of the slots 25, 23 and 24 of the plate 22. The rings 42, 43 and 44, together with the sleeves 32, 33 and 34, are pushed forward and turned to the left, the ends of the pins 46, 48 and 50 passing through the slots 25, 23 and 24 and into the holes 9ᶜ, 9ᵃ, and 9ᵇ of the disk 9, to which is secured the rod 7 which is fastened to the butterfly valve 4. When the rings 42, 43 and 44 are turned to the left, after they have been arranged in alinement and pushed forward so that the ends of the pins 46, 48 and 50 are in the holes 9ᶜ, 9ᵃ and 9ᵇ of the disk 9, the disk 9 moves with the rings and opens the butterfly valve 4 through the medium of the rod 7.

After the pins 46, 48 and 50 have been turned far enough to the left, they will be pushed back through the enlarged slot openings in the disk 22 by the spring 40. The rings 42, 43 and 44 and the sleeves 32, 33 and 34 will be in the back position again. The butterfly valve 4 is then open as far as it can be. The butterfly valve 4 may be locked by means of the rings or the lever 51. The procedure for locking the valve by means of the rings is the same as opening it, except the direction of rotation is reversed. The rings, after being arranged in alinement, are pushed forward, then turned to the right, until they are pushed out by the spring 40. The butterfly valve 4 is then closed.

For instantly locking the valve 4, the lever 51 is used. The procedure for locking the valve 4 by means of the lever 51 is described as follows: When the butterfly valve 4 is open and the rings and the sleeves are in the back position, the lever 51, which is integral with the disk 19, is in the dotted position, as shown in Fig. 6. The butterfly valve 4 is instantly closed by simply moving the lever 51 into the position shown in full lines in Fig. 6. The flange 20 of the disk 19 engages the shoulder 52 of the disk 9 and rotates the disk 9 until it is stopped by the shoulder 53 engaging with the pin 54.

When opening the valve 4, the shoulder 52 of the disk 9 engages the flange 20 of the disk 19, of which the lever 51 is integral, and rotates it until the flange 20 engages the pin 54.

For safety purposes, the combination of the lock may be changed by changing the rings with relation to the sleeves. The rings 42, 43 and 44 are changed by placing the lock in the position shown in Fig. 10, and pushing all the rings against the plate 30 while the sleeves 32, 33 and 34 are in the forward position. This allows the rings to rotate around the sleeves 32, 33 and 34, the pins 45 of the rings rotating in the recesses 101 of the sleeves. It will be noted that in order to change the combination, one must know the previous combination which is necessary for unlocking the device. It is, therefore, apparent that unauthorized persons may not change the combination, since they will not know the previous combination, and hence cannot change the combination in the absence of the owner and to his detriment.

I claim:

1. A combination lock comprising a perforated disk having a hub, a plurality of rotatable sleeves movable toward and away from said disk, means carried by said sleeves arranged to enter the perforations in said disk, for rotating said disk when the sleeves are rotated, and rings disposed exteriorly of said sleeves and concentric therewith for rotating the latter at will.

2. A combination lock comprising a perforated disk having a hub, a plurality of rotatable sleeves movable toward and away from said disk, means carried by said sleeves arranged to enter the perforations in said disk, for rotating said disk when the sleeves are rotated, and auxiliary means for rotating said perforated disk in one direction, independently of the means on the sleeves.

3. A combination lock comprising a perforated disk having a hub, a plurality of rotatable sleeves movable toward and away from said disk, means carried by said sleeves arranged to enter the perforations in said disk, for rotating said disk when the sleeves are rotated, and auxiliary means for rotating said perforated disk in one direction, independently of the means on the sleeves, said last named means comprising a handle, a rotatable disk connected with the handle and means carried by the rotatable disk for engaging said first named disk.

4. A combination lock comprising a disk having a hub and being provided with a plurality of openings, a second disk having slots arranged to register with the openings in the first named disk, a plurality of concentric sleeves rotatable with respect to a common axis and movable longitudinally along said axis, each of said sleeves having a pin arranged to enter its individual slot in said second named plate and to enter said perforations in said first named plate, when said pins are in position to register with their respective slots, and means disposed exteriorly of said sleeves and concentric therewith for rotating the latter at will.

5. A combination lock comprising a disk having a hub and being provided with a plurality of openings, a second disk having slots arranged to register with the openings in the first named disk, a plurality of concentric sleeves rotatable with respect to a common axis and movable longitudinally along said axis, each of said sleeves having a pin arranged to enter its individual slot in said second named plate and to enter said perforations in said first named plate, when said pins are in position to register with their respective slots, certain of said pins having grooves to permit the pins to engage the second named plate to prevent the retraction of the pins until said second named plate is in a predetermined position.

6. A combination lock comprising a disk having a hub and being provided with a plurality of openings, a second disk having slots arranged to register with the openings in the first named disk, a plurality of concentric sleeves rotatable with respect to a common axis and movable longitudinally along said axis, each of said sleeves having a pin arranged to enter its individual slot in said second named plate and to enter said perforations in said first named plate, when said pins are in position to register with their respective slots, certain of said pins having grooves to permit the pins to engage the second named plate to prevent the retraction of the pins until said second named plate is in a predetermined position, and a spring disposed between said second named plate and said sleeves for forcing the latter away from said second named plate.

7. A combination lock comprising a disk having a hub and being provided with a plurality of openings, a second disk having slots arranged to register with the openings in the first named disk, a plurality of concentric sleeves rotatable with respect to a common axis and movable longitudinally along said axis, each of said sleeves having a pin arranged to enter its individual slot in said second named plate and to enter said perforations in said first named plate, when said pins are in position to register with their respective slots, certain of said pins having grooves to permit the pins to engage the second named plate to prevent the retraction of the pins until said second named plate is in a predetermined position, a spring disposed between said second named plate and said sleeves for forcing the latter away from said second named plate, and a stop plate for limiting the movement of said sleeves away from said second named plate.

ARTHUR HERBERT BUCKLEY.